US009967463B2

(12) United States Patent
Mourikis et al.

(10) Patent No.: US 9,967,463 B2
(45) Date of Patent: May 8, 2018

(54) METHOD FOR CAMERA MOTION ESTIMATION AND CORRECTION

(71) Applicant: The Regents of The University of California, Oakland, CA (US)

(72) Inventors: Anastasios Mourikis, Riverside, CA (US); Mingyang Li, Riverside, CA (US)

(73) Assignee: The Regents of The University of California, Oakland, CA (US)

( * ) Notice: Subject to any disclaimer, the term of this patent is extended or adjusted under 35 U.S.C. 154(b) by 0 days. days.

(21) Appl. No.: 14/906,869

(22) PCT Filed: Jul. 24, 2014

(86) PCT No.: PCT/US2014/048055
§ 371 (c)(1),
(2) Date: Jan. 21, 2016

(87) PCT Pub. No.: WO2015/013534
PCT Pub. Date: Jan. 29, 2015

(65) Prior Publication Data
US 2016/0165140 A1 Jun. 9, 2016

Related U.S. Application Data

(60) Provisional application No. 61/857,922, filed on Jul. 24, 2013.

(51) Int. Cl.
*H04N 5/225* (2006.01)
*H04N 5/232* (2006.01)
(52) U.S. Cl.
CPC ....... *H04N 5/23267* (2013.01); *H04N 5/2329* (2013.01); *H04N 5/23258* (2013.01); *H04N 5/23293* (2013.01)

(58) Field of Classification Search
CPC .......... H04N 5/23254; H04N 5/23251; H04N 5/144; H04N 5/145; H04N 5/23258;
(Continued)

(56) References Cited

U.S. PATENT DOCUMENTS 6,272,432 B1 8/2001 Li et al.
7,817,187 B2 * 10/2010 Silsby .................. G11B 31/006
348/208.6
(Continued)

FOREIGN PATENT DOCUMENTS

WO WO-2015013534 A1 1/2015

OTHER PUBLICATIONS

International Application Serial No. PCT/US2014/048055, International Search Report dated Nov. 25, 2014, 3 pgs.
(Continued)

*Primary Examiner* — Twyler L Haskins
*Assistant Examiner* — Dwight Alex C Tejano
(74) *Attorney, Agent, or Firm* — Schwegman Lundberg & Woessner, P.A.

(57) ABSTRACT

A motion estimation and correction system and methods are shown comprising: an image acquisition device configured to acquire an image via scanning an image frame over a period of time, an inertial measurement unit configured to measure at least one of a position, an orientation, and a movement of the image acquisition device during the period of time and output an indication of the movement as detected; and a state estimation module, operatively coupled to the inertial measurement unit and the image acquisition device, configured to estimate a state related to at least one of position and orientation of the image acquisition device based on the at least one of the position, the orientation, and the movement. In one example, systems and methods include using an inertial measurement unit along with an (Continued)

image acquisition device. In one example, the image acquisition device includes a rolling-shutter camera.

24 Claims, 4 Drawing Sheets

(58) Field of Classification Search
CPC . H04N 5/23264; G06T 7/20; G06T 13/19602; G08B 13/19602; G09G 2320/106; G03B 2205/0007; G03B 2217/005; G03B 2207/005; G02B 27/646
See application file for complete search history.

(56) References Cited

U.S. PATENT DOCUMENTS

| | | | | |
|---|---|---|---|---|
| 2008/0030587 | A1* | 2/2008 | Helbing | G06T 5/50 348/208.4 |
| 2009/0021588 | A1* | 1/2009 | Border | H04N 5/23248 348/208.1 |
| 2009/0052743 | A1* | 2/2009 | Techmer | G06T 7/2033 382/107 |
| 2009/0219402 | A1* | 9/2009 | Schneider | G03B 17/00 348/208.7 |
| 2009/0248304 | A1* | 10/2009 | Roumeliotis | G01C 21/16 701/500 |
| 2011/0085049 | A1 | 4/2011 | Dolgin et al. | |
| 2011/0257927 | A1 | 10/2011 | Bharadwaj et al. | |
| 2012/0307084 | A1* | 12/2012 | Mantzel | H04N 5/23248 348/208.2 |
| 2013/0129230 | A1 | 5/2013 | Shotton et al. | |

OTHER PUBLICATIONS

International Application Serial No. PCT/US2014/048055, Written Opinion dated Nov. 25, 2014, 5 pgs.
"European Application Serial No. 14829982.9, Extended European Search Report dated Jan. 18, 2017", 12 pgs.
Furgale, Paul, et al., "Continuous-Time Batch Estimation using Temporal Basis Functions", 2012 IEEE International Conference on Robotics and Automation, St. Paul, MN, May 14-18, 2012, (May 14, 2012), 2088-2095.
Li, Mingyang, et al., "Real-time motion tracking on a cellphone using inertial sensing and a rolling-shutter camera", Proceedings, IEEE International Conference on Robotics and Automation (ICRA), Karlsruhe, Germany, (2013), 4712-4719.
European Application Serial No. 14829982.9, Response Filed Aug. 2, 2017 to Extended European Search Report dated Jan. 18, 2017, 9 pgs.

\* cited by examiner

METHOD FOR CAMERA MOTION ESTIMATION AND CORRECTION

This application is a U.S. National Stage Filing under 35 U.S.C. 371 from International Application No. PCT/US2014/048055, filed on Jul. 24, 2014, and published as WO 2015/013534 A1 on Jan. 29, 2015, which claims the benefit of priority under 35 U.S.C. § 119(e) to U.S. Provisional Patent Application No. 61/857,922, filed on Jul. 24, 2013, which are hereby incorporated by reference herein in their entireties.

This invention was made with Government support under Grant No. IIS1117957 awarded by the National Science Foundation. The Government has certain rights in this invention.

TECHNICAL FIELD

This invention relates to devices and methods for monitoring and correcting an image. In one example, this invention relates to monitoring and correcting a scanned image.

DETAILED DESCRIPTION

Figure 1:
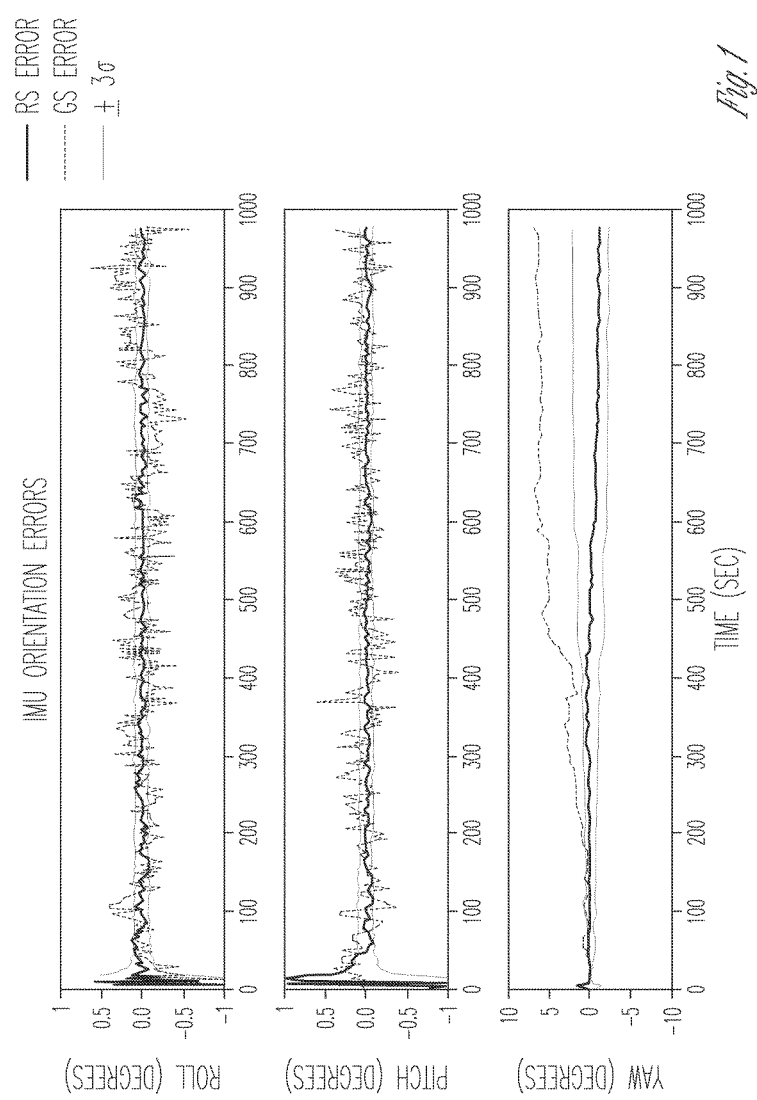
FIG. 1 shows a graph showing orientation errors during a localization experiment according to an example of the invention.

In various examples, the pose (i.e., the position and orientation) of a device equipped with an inertial measurement unit (IMU), such as may include some or all of an accelerometer, a magnetometer, a gyroscope, and/or other suitable equipment, and a scanning camera or other image acquisition system that acquires images by scanning across a frame, such as a rolling-shutter camera, may be estimated. To this end, a state estimator, such as may be or include an extended Kalman filter, an iterative-minimization method, a sliding-window bundle adjustment, or other estimation process, has been developed which processes the measurements of the IMU and camera. The state estimator may, in various examples, be used in relation to observations of features in the images of the scanning camera.

In contrast to global-shutter cameras, scanning cameras capture rows of an image sequentially, and as a result the entire image may be captured over a time interval of non-zero duration, called the readout time of the image. For typical cameras found in consumer devices such as smartphones, the readout time may be on the order of a few tens of milliseconds, which may be enough to cause potentially significant visual distortions. If the effect of the rolling shutter is ignored, the estimation precision can be significantly degraded.

The observations of scene features in a single image from a scanning camera may not depend on a single camera pose. In an example, a reference time instant t is selected during the image readout time. The reference time instant t can be selected, for example, as the time instant the first, last, or middle row of the image is captured. If a feature (e.g., a "corner" point feature) is detected on an image row that is n rows away from this "reference" row, its measurement may be described by:

$$z = h(^C p_f(t+nt_r)) + n \quad (1)$$

where h is the measurement function describing the camera model (e.g., the perspective function), $t_r$ is the time between the capturing of two consecutive image rows, n is the measurement noise, and $^C p_f(t+nt_r)$ is the position of the feature with respect to the camera frame at time $t+nt_r$. This position vector may be given by:

$$^C p_f(t+nt_r) = {_G^C}R(t+nt_r)(^G p_f - {^G}p_c(t+nt_r)) \quad (2)$$

where $_G^C R(t+nt_r)$ is the rotation matrix between the camera frame and the global frame of reference at time $t+nt_r$, $^G p_c(t+nt_r)$ is the camera position at $t+nt_r$, and $^G p_f$ is the feature position in the global frame. Thus, the feature measurements at different image rows may depend on different camera poses. In various examples, to process these measurements for state estimation, the estimator's state vector may include one camera pose per row of the image. This, however, may utilize hundreds of poses to be included in the state vector for each image, and may be relatively computationally intensive for all but relatively short trajectories.

Certain methods for state estimation using a scanning camera may employ some form of approximation of the camera trajectory. For instance, certain vision-only methods employ assumptions about the camera motion between the time instants images are recorded. In one case, the camera motion may be assumed to vary linearly, while in another case, a higher-order model for the motion may be used. In various examples, for good performance, the camera images are processed at relatively high frame rates, so that the changes in the camera's motion between the image capture times are relatively small.

In various instances, an assumption of constant linear and rotational velocity during the image readout time was employed. Since the readout time can be significantly smaller than a period at which images are used, this may be a less strict assumption. However, in cases where the camera's motion profile changes significantly during the readout time (e.g., when a device is handheld and the person is walking fast, or when the device is mounted on a robot moving fast on uneven terrain), the assumption may not hold.

In various instances, the motion of the camera may be modeled by employing a temporal-basis-function formulation. This approach can describe complex motions, but this may come at the cost of increased computational intensity. To model rapidly changing motions, the state vector that describes the trajectory may have a large dimension (i.e., a temporal-function basis of large dimension must be used). This may make real-time application difficult, and other approaches that employ the temporal-basis formulation may employ offline batch-estimation.

In contrast to various cases, the IMU measurements may be used to compute the camera trajectory during the image readout time, and a parametric model may be used to model the error in these motion estimates, in contrast to using a model of the camera motion itself. In various examples, the IMU position during the image readout time is modeled as:

$$^G p_I(t+\tau) = ^G \hat{p}_I(t+\tau) + ^G \tilde{p}_I(t+\tau)$$

where the estimate $^G \hat{p}_I(t+\tau)$ is computed by integrating the IMU measurements starting from the reference pose, and the error $^G \tilde{p}_I(t+\tau)$ is parameterized using m basis functions, as:

$${}^G\tilde{p}_I(t+\tau) = \sum_{i=0}^{m-1} c_i f_i(\tau) \tag{3}$$

where $c_i$ are the unknown parameter vectors, and $f_i(\tau)$ are basis functions that we are free to select. Similarly to the position, propagation based on the gyroscope measurements may be used to compute estimates of the IMU orientation during the readout time. The error in these estimates may be described by a 3×1 error vector $\tilde{\theta}(t+z)$, and it may be parameterized using k basis functions as:

$$\tilde{\theta}(t+\tau) = \sum_{i=0}^{k-1} d_i f_i(\tau) \tag{4}$$

where $d_i$ are the unknown parameter vectors. This approach may include no assumptions on the form of the trajectory, and thus arbitrarily complex motions may be described, as long as they are within the bandwidth of the IMU's sensors. At the same time, the error in the motion can be modeled to any of a variety of levels of accuracy desired, such as by choosing the number of basis functions. The type and number of basis functions may be chosen so that the approximation errors may be predicted in advance. In various examples, even with relatively few terms the error may be modeled to sufficient accuracy.

In various examples, in any estimator that employs linearization (such as the extended Kalman filter, or iterative minimization-based estimators), the estimator equations may be written in terms of a measurement residual (what may be termed "innovation" in Kalman filter-based estimators), which may be defined as the difference between the actual feature measurements and the measurements expected based on the state estimates, $\hat{x}$. These residuals may then be approximated by a linearized expression involving the state estimates' errors, $\tilde{x}$:

$$r \triangleq z - h(\hat{x}) \tag{5}$$

$$\simeq H\tilde{x} + n \tag{6}$$

where H is the Jacobian matrix of the measurement function with respect to the state. $\hat{x}$ and $\tilde{x}$ do not necessarily have the same parametrization (for instance, orientation state estimates are typically represented via 3×3 rotation matrices or 4×1 unit quaternions, while the orientation errors are typically represented via minimal, 3×1 parameterizations.

Equation (2) may be re-written in terms of the IMU pose as:

$$^C p_f(t+nt_r) = {}^C_I R {}^I_G R(t+nt_r)({}^G p_f - {}^G p_I(t+nt_r)) + {}^C p_I \tag{7}$$

where $^C_I R$ and $^C p_I$ are the orientation and position of the IMU with respect to the camera, while $^I_G R(t+nt_r)$ and $^G p_I(t+nt_r)$ define the orientation and position of the IMU in the global frame at $t+nt_r$. An estimate of the feature position, used to compute the expected measurement, may be:

$$^C\hat{p}_f(t+nt_r) = {}^C_I\hat{R}{}^I_G\hat{R}(t+nt_r)({}^G\hat{p}_f - {}^G\hat{p}_I(t+nt_r)) + {}^C\hat{p}_I \tag{8}$$

where ^ represents the estimate of a quantity in the estimator. The estimates of the IMU pose at $t+nt_r$ may be computed using the IMU measurements during the readout time, and the IMU state estimate at time t (the estimate of the "reference pose"). Specifically, the estimated IMU position at $t+nt_r$ may be computed as:

$$^G\hat{p}_I(t+nt_r) = {}^G\hat{p}_I(t) + {}^G\hat{v}_I(t)nt_r + \int_t^{t+nt_r}\int_{ts}{}^G\hat{a}_I(\tau)d\tau ds$$

where $^G\hat{v}_I$ is the IMU velocity and $^G\hat{a}_I$ is the estimated acceleration of the IMU, computed using the accelerometer measurements (after compensating for gravity and for any systematic errors such as biases, scale factors, etc.). If a unit-quaternion is used for representing the IMU orientation (as in our implementation), then the orientation at time $t+nt_r$ may be computed by integrating the following differential equation in the time interval $[t, t+nt_r]$:

$$^I_G\dot{\hat{q}}(\tau) = \frac{1}{2}\begin{bmatrix} -\lfloor {}^I\hat{\omega}(\tau)\times\rfloor & {}^I\hat{\omega}(\tau) \\ -{}^I\hat{\omega}(\tau)^T & 0 \end{bmatrix}{}^I_G\hat{q}(\tau) \tag{10}$$

where $^I\hat{\omega}$ is the estimated rotational velocity of the IMU (i.e., the velocity measured by the gyro compensated for any systematic errors such as biases, scale factors, etc.).

Using the estimates of the IMU pose computed by Equations (9) and (10), the residuals of the feature measurements may be:

$$r = z - h({}^C_I\hat{R}{}^I_G\hat{R}(t+nt_r)({}^G\tilde{p}_f - {}^G\hat{p}_I(t+nt_r)) + {}^C\tilde{p}_I)$$

Linearizing:

$$r \simeq H_\theta\tilde{\theta}(t+nt_r) + H_p{}^G\tilde{p}_I(t+nt_r) + H_a x_a + n$$

where $H_\theta$ and $H_p$ are the Jacobians of the measurement function with respect to the camera position and orientation at time $t+nt_r$, $x_a$ includes the errors of the camera-to-IMU calibration, feature position, and potentially any additional variables that appear in the measurement function (e.g., camera intrinsic parameters), and $H_a$ is the corresponding Jacobian. Using Equations (3) and (4), the above can be written as:

$$r \simeq \sum_{i=0}^{m-1}(H_\theta f_i(nt_r))c_i + \sum_{i=0}^{k-1}(H_p f_i(nt_r))d_i + H_a x_a + n \tag{11}$$

As a result, instead of including the IMU pose errors at the time instants corresponding to all the image rows in the estimator's error-state vector, the vectors $c_i$, i=0, ... m−1, and $d_i$, i=0, ... k−1 may be included. Since the number of these vectors can be chosen to be significantly smaller than the IMU pose errors, relative computational savings may be realized.

Choice of Basis Vectors

An appropriate type and number of terms in the error representation may provide relative improvement in computation savings and/or the overall accuracy of the final result. The functions $$f_i(\tau) = \frac{\tau^i}{i!},$$

may be the temporal basis, producing:

$$^G\tilde{p}_I(t+nt_r) = c_0 + c_1 nt_r + \frac{1}{2}c_2(nt_r)^2 + \ldots + \frac{1}{(m-1)!}c_{m-1}(nt_r)^{m-1} \quad (12)$$

In various examples, certain properties of errors may be utilized to determine the number of terms to keep in the above representation. In an example, if only the first two terms are kept, Equation (12) produces:

$$^G\tilde{p}_I(t+nt_r) = {}^G\tilde{p}_I(t) + c_1 nt_r$$

Where, for n=0, the right-hand side equals $^G\tilde{p}_I(t)$, i.e., the position error of the reference pose. The error incurred by approximating the function $^G\tilde{p}_I(t+nt_r)$ by the above linear function (which is effectively a first-order spline approximation) is upper bounded along each of the three coordinate axes by:

$$\frac{(nt_r)^2}{8}\max|{}^G\ddot{\tilde{p}}|$$

where max $|{}^G\ddot{\tilde{p}}|$ is the maximum absolute value of the second derivative of the position errors along each axis, i.e., the maximum absolute value of the acceleration errors.

In an example, assuming a worst-case acceleration error of 2 m/sec² (which may, in various examples, be unrealistically large), and a readout time of 1/30 sec, then the approximation error is upper bounded by 6.9×10⁻⁵ m along each axis, if the "reference pose" is selected to be the camera pose at the midpoint of the image readout interval. In a camera with resolution 480×640 pixels, field of view of 60 degrees, and focal length equal to approximately 500 pixels, imaging objects at a minimum depth of 1 m, an unmodeled position error of this magnitude may result in a worst-case unmodeled error in the feature projections of approximately 0.15 pixels. For features at a depth of 2 m, and with an acceleration error bound of 1 m/sec², the worst-case unmodeled feature projection error may be 0.02 pixels.

A similar process may be utilized to determine the number of terms for modeling the orientation errors. In various examples, the unmodeled errors remain small even if only a single term in the representation is used:

$$\theta(t+nt_r) = \theta(t)$$

Viewing this as a Taylor-series expansion truncated after the first (zero-order) term, the worst-case error in the parameterization of $\tilde{\theta}(t+nt_r)$ may be given by $nt_r$ max $|\omega|$. In an example, assuming a worst-case error in the rotational velocity estimates of 2 deg/sec, the inaccuracy of the parameterization is bounded to below 0.033 degrees. In an example camera with resolution of 10 pixels per degree, this would correspond to a worst-case unmodeled feature projection error of 0.33 pixels.

In various examples, the residual of the feature measurement in Equation (11) may be approximated by:

$$r \approx H_\theta \tilde{\theta}(t) + H_p {}^G\tilde{p}_I(t) + (nt_r H_p) c_1 + H_a \tilde{x}_a + n$$

In turn, this shows that if the error-state of the estimator contains the variables $\tilde{\theta}(t)$, and $^G\tilde{p}_I(t)$, and $c_1$, the measurements of the scanning camera may be processed with minimal approximations. In an example, for a global-shutter camera only the position and orientation errors, $\tilde{\theta}(t)$ and $^G\tilde{p}_I(t)$, may be included, and therefore the use of a scanning camera may incur some relatively larger computational costs. However, this overhead may be relatively minimal (e.g., only one additional 3×1 vector per image) and it may be independent of the complexity of the trajectory.

In various examples, the method for processing the measurements of the scanning camera may adapt to the properties of the estimation errors. For instance, if in a certain scenario the errors in the acceleration or rotational velocity measurements are larger, more terms may be included in the temporal-basis-function representation of the errors. Similarly, if the errors in the velocity estimates are very small, a single term in the representation of the position errors may be retained (see Equation (12)), and still incur relatively minimal inaccuracies (the bound in the approximation error in that case is given by $nt_r$ max $|{}^G\tilde{v}|$ where max $|{}^G\tilde{v}|$ is the maximum absolute value of the velocity error along each axis). In an example, by changing the number of terms kept in the representation, accuracy may be traded off for computational efficiency.

Example Simulations

A method for processing the feature measurements from a scanning camera with the aid of an IMU is applicable in a multiple example state estimators. To demonstrate the performance of the method, in comparison to an approach that does not account for the presence of a rolling shutter in the images, the method disclosed herein is applied in conjunction with the hybrid estimator. To prevent EKF inconsistency, certain provisions may be made when Jacobians are computed.

For the results presented here, we use a simulation of a real-world dataset, collected by a hand-held mobile device by a walking person. The total trajectory length is 1.1 km, covered over 16 minutes of walking. On average, 200 point features are tracked in each image, and their world positions and track lengths are generated to match those of the features tracked in the real dataset. The IMU is providing measurements at 200 Hz, while the camera images are available at 10 Hz.

FIG. 1 shows the estimation errors for the IMU orientation computed by the method described in the preceding sections (red lines), as well as the estimation errors resulting by treating the camera as a global-shutter camera (black dash-dotted lines). Moreover, the ±3 standard deviation envelope computed using the filter's reported covariance matrix, is shown in dashed blue lines. A relatively significant inflation of the image covariance matrix was utilized. In the example case, the rolling-shutter distortion was treated effectively as noise. However, where the effect of the rolling-shutter is explicitly modeled, relatively significantly higher precision was obtained, and errors that are commensurate with the covariance matrix were reported by the filter.

Figure 2:
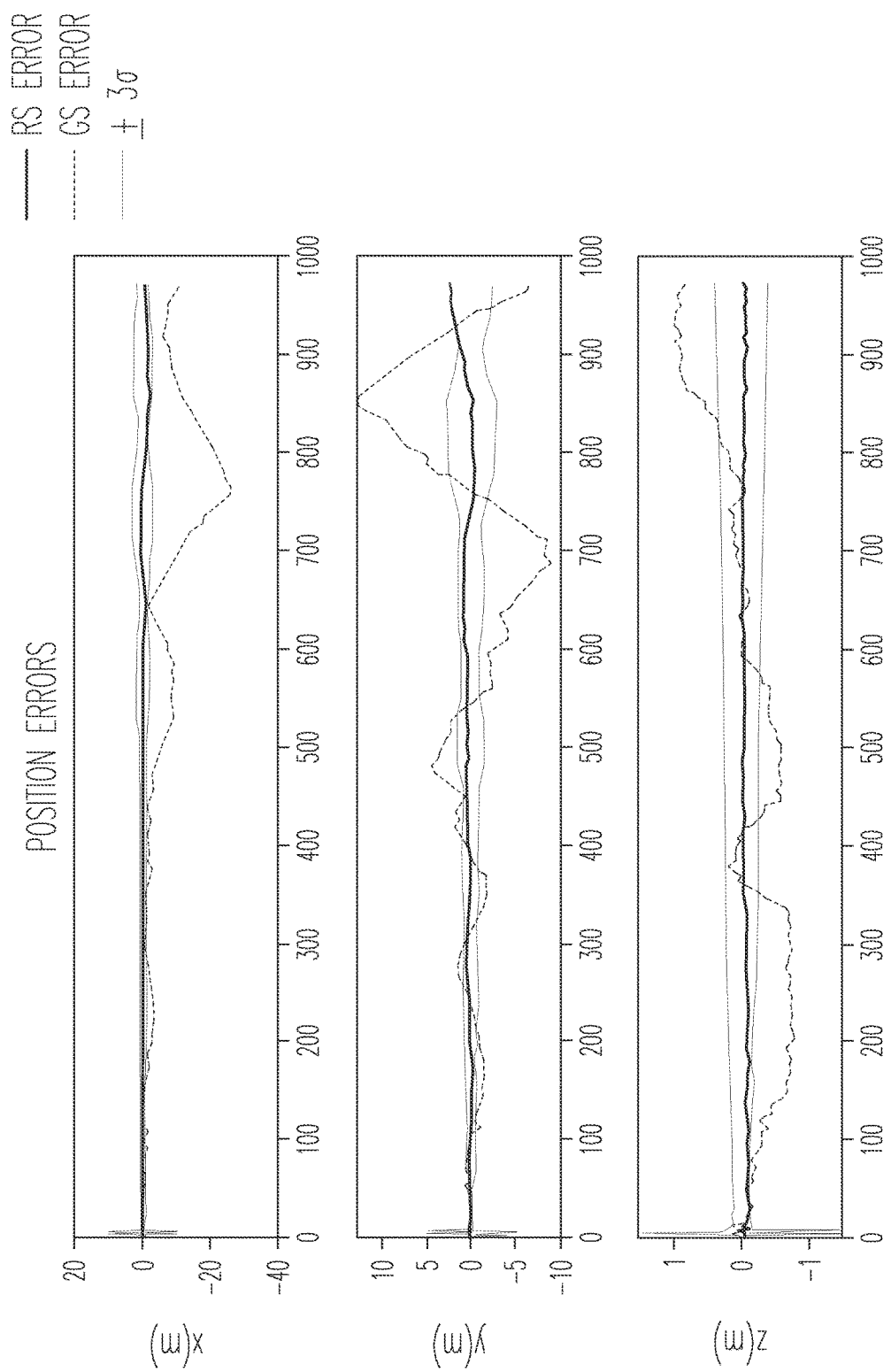
FIG. 2 shows a graph showing position errors during an experiment according to an example of the invention.
Figure 3:
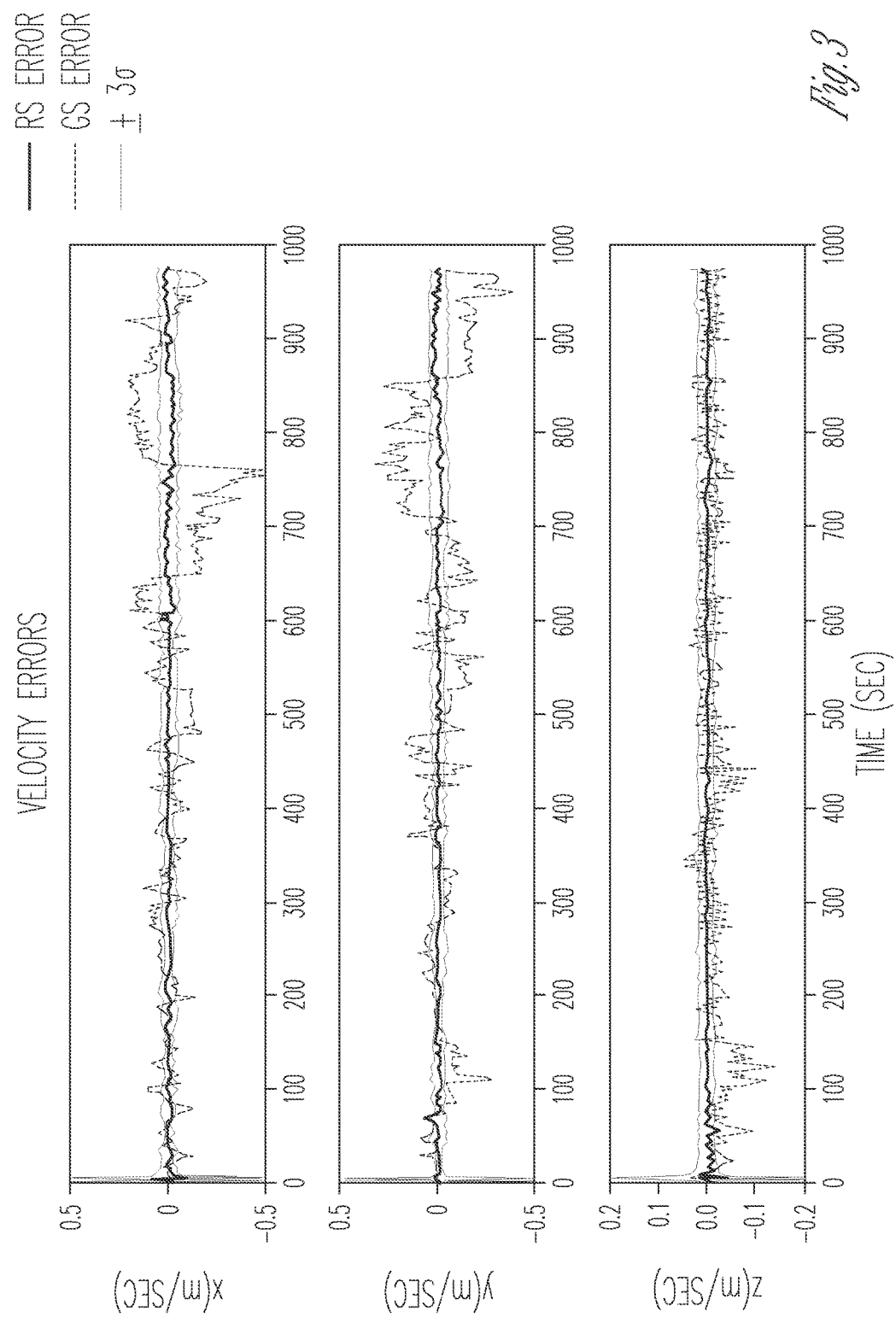
FIG. 3 shows a graph showing errors in velocity estimates according to an example of the invention.

FIG. 2 shows the position errors during the same experiment, while FIG. 3 shows the errors in the velocity estimates. Similarly to what was observed in the case of the orientation errors, modeling the rolling shutter may result in improved estimation performance.

With respect to FIG. 1 in particular, FIG. 1 illustrates orientation errors during a localization experiment. To generate the data, the estimator employs a unit-quaternion representation for the orientation, but for plotting purposes the errors are expressed in terms of roll, pitch, and yaw. The red lines represent the orientation errors from the method described here, the black dash-dotted lines show the errors from treating the camera as a global-shutter one, while the dashed blue lines show the uncertainty envelope computed as ±3 times the corresponding standard deviation reported by the estimator.

With respect to FIG. 2 in particular, FIG. 2 illustrates position errors along the three coordinate axes during the localization experiment. The red lines represent the orientation errors from the method described herein, the black dash-dotted lines show the errors from treating the camera as a global-shutter one, while the dashed blue lines show the uncertainty envelope computed as ±3 times the corresponding standard deviation reported by the estimator.

With respect to FIG. 3 in particular, FIG. 3 illustrates velocity errors along the three coordinate axes during the localization experiment. The red lines represent the orientation errors from the method described herein, the black dash-dotted lines show the errors from treating the camera as a global-shutter one, while the dashed blue lines show the uncertainty envelope computed as ±3 times the corresponding standard deviation reported by the estimator.

System Diagram

Figure 4:
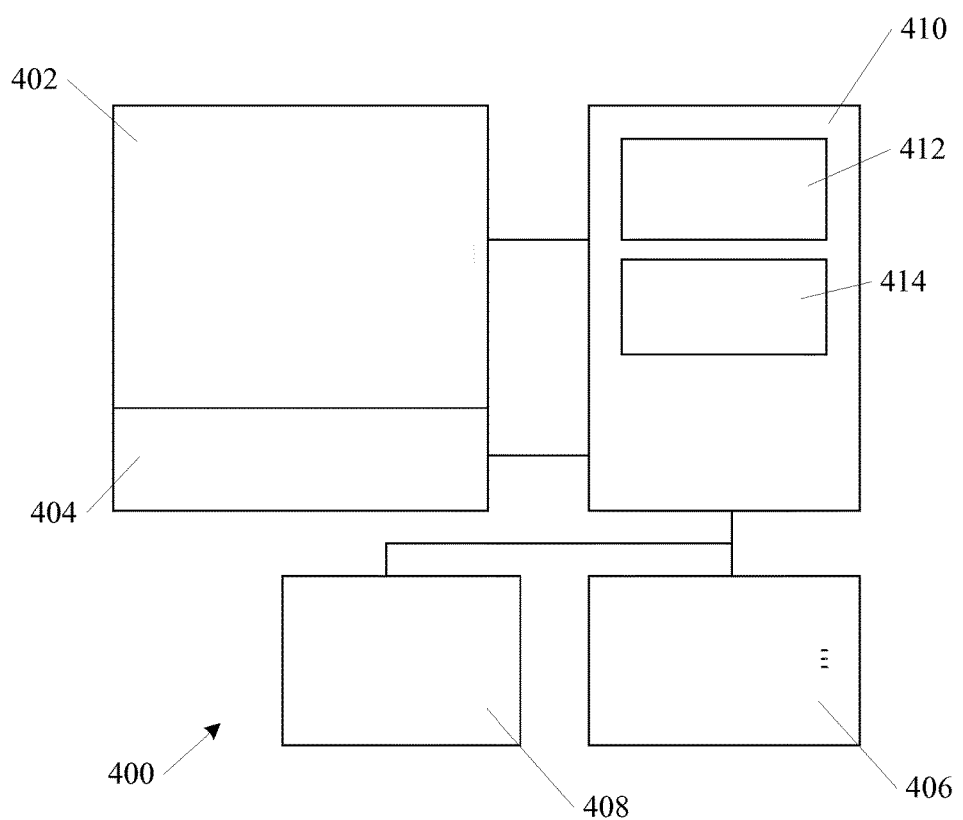
FIG. 4 shows a block diagram of a system according to an example of the invention.

FIG. 4 is a block diagram of an example system 400. The system 400 includes an inertial measurement unit 404 and an image acquisition device 402. A state estimation circuit 410 is further shown coupled to the image acquisition device 402 and the inertial measurement unit 404. The state estimation circuit 410 of the example of FIG. 4, further includes a processor 412, and a memory module 414. In one example, as shown in FIG. 4, the system 400 further includes a user interface 406 and a correction module 408. It is noted and emphasized that the components of the block diagram correspond to the components as disclosed herein and are configured to perform the actions and calculations disclosed herein. It is to be noted that while the system as illustrated in FIG. 4 includes various components, in various examples such components are optional and may or may not be included as appropriate or desired.

As illustrated, the system includes an image acquisition system and an inertial measurement unit. As illustrated, the inertial measurement unit is attached to the image acquisition system. However, in various examples, the inertial measurement unit is a component of the image acquisition system or the image acquisition system and the inertial measurement unit are components of a larger device, such as a cellular telephone, tablet computer, or other consumer electronic device.

As illustrated the system further includes a state estimation module or state estimation circuit. The state estimation module includes a processor and a memory module, such as may include conventional computer memory and/or other electronic storage technologies, such as random access memory (RAM), read only memory (ROM), flash memory, a hard disk, and/or other electronic storage technologies known in the art. The processor may include or be implemented as a microprocessor, microcontroller, controller, or other processing technology known in the art. The state estimation module may, instead of being processor-based, be based on dedicated circuitry configured to execute estimation as disclosed herein.

The state estimation module may generate an output that may be transmitted to a user interface for display or otherwise being conveyed to a user, such as in raw data form or as a graph as illustrated in FIGS. 1-3. The system further optionally includes a distortion correction module. The distortion correction module may apply correction to the image by utilizing the estimates produced by the state estimation module to the image as generated by the image acquisition system to compensate for the distortion in the image. However, in various examples, post hoc distortion correction may be unnecessary owing to utilizing the above methods to model and compensate for distortion during the obtaining of the image, as detailed above.

To better illustrate the motion estimation and correction systems, and related methods disclosed herein, a non-limiting list of examples is now provided:

In Example 1, a system includes an image acquisition device configured to acquire an image via scanning an image frame over a period of time, an inertial measurement unit configured to measure at least one of a position, an orientation, and a movement of the image acquisition device during the period of time and output an indication of the movement as detected, and a state estimation module, operatively coupled to the inertial measurement unit and the image acquisition device, configured to estimate a state related to at least one of position and orientation of the image acquisition device based on the at least one of the position, the orientation, and the movement.

In Example 2, the system of Example 1 is optionally configured such that the state estimation module is configured to output the state as estimated, and further comprising a user interface configured to display the state as output from the state estimation module.

In Example 3, the system of any one or any combination of Examples 1-2 is optionally configured such that the inertial measurement unit is rigidly connected to the image acquisition device.

In Example 4, the system of any one or any combination of Examples 1-3 is optionally configured such that the image acquisition device is a rolling-shutter camera.

In Example 5, the system of any one or any combination of Examples 1-4 is optionally configured such that the state estimation module comprises a processor configured to apply a parametric model to the movement to estimate the state.

In Example 6, the system of any one or any combination of Examples 1-5 is optionally configured such that the inertial measurement unit includes at least one of an accelerometer, a gyroscope, and a magnetometer.

In Example 7, the system of any one or any combination of Examples 1-6 is optionally configured such that the state estimation module is configured to output the state as estimated, and further comprising a state correction module operatively coupled to the state estimation module and configured to correct the image according to the state as output from the state estimation module.

In Example 8, the system of any one or any combination of Examples 1-7 is optionally configured such that the state estimation module is configured to use a parametric model of the errors in the state estimates to effect the computation of the state updates.

In Example 9, the system of any one or any combination of Examples 1-8 is optionally configured such that the state estimation module is configured to use a parametric model developed on a basis of temporal functions.

In Example 10, a state estimation circuit includes a memory module configured to store a description of a movement of an image acquisition device as computed based on an output of an inertial measurement unit during a period of time, and a processor configured to estimate a state related to at least one of position and orientation of the image acquisition device, wherein the image acquisition device is configured to acquire the image via scanning an image frame over the period of time.

In Example 11, the state estimation circuit of claim 10 is optionally configured such that the state estimation circuit is configured to output the state as estimated to a user interface configured to display the state as output.

In Example 12, the state estimation circuit of any one or any combination of Examples 10-11 is optionally configured such that the image acquisition device is a rolling-shutter camera.

In Example 13, the state estimation circuit of any one or any combination of Examples 10-12 is optionally configured such that the inertial measurement unit includes at least one of an accelerometer, a gyroscope, and a magnetometer.

In Example 14, the state estimation circuit of any one or any combination of Examples 10-13 is optionally further configured to correct the image according to the state.

In Example 15, the state estimation circuit of any one or any combination of Examples 10-14 is optionally configured such that the processor is configured to model motion of the image acquisition device during the period of time, in order to compute measurement residuals for updating a state estimate.

In Example 16, the state estimation circuit of any one or any combination of Examples 10-15 is optionally configured such that the processor is configured to apply a parametric model of one or more errors in a state estimate to effect a computation of a state update.

In Example 17, the state estimation circuit of any one or any combination of Examples 10-16 is optionally configured such that the processor is configured to apply a parametric model developed on a basis of temporal functions.

In Example 18, a method includes acquiring an image from an image acquisition device by scanning an image frame over a period of time, using an inertial measurement unit to acquire at least one of a position, an orientation, and a movement of the image acquisition device during the period of time, and estimating a state relating to the image acquisition device with a state estimation module.

In Example 19, the method of Example 18 optionally further includes displaying, on a user interface, the state as estimated from the state estimation module.

In Example 20, the method of any one or any combination of Examples 18-19 further includes using the inertial measurement unit includes using an inertial measurement unit that is rigidly connected to the image acquisition device.

In Example 21, the method of any one or any combination of Examples 18-20 includes acquiring the image from an image acquisition device includes acquiring an image from a rolling-shutter camera.

In Example 22, the method of any one or any combination of Examples 18-21 includes estimating the state relating to the image acquisition device includes utilizing a processor configured to apply a parametric model to the movement to estimate the state.

In Example 23, the method of any one or any combination of Examples 18-22 includes using the inertial measurement unit includes using at least one of an accelerometer, a gyroscope, and a magnetometer.

In Example 24, the method of any one or any combination of Examples 18-23 further includes using an state correction module to correct the image according to the state as output from the state estimation module.

In Example 25, the method of any one or any combination of Examples 18-24 includes estimating a state includes using inertial measurements to model motion of the image acquisition device during the period of time to compute measurement residuals for updating a state estimate.

In Example 26, the method of any one or any combination of Examples 18-25 includes estimating a state includes using a parametric model of one or more errors in a state estimate to effect a computation of a state update.

In Example 27, the method of any one or any combination of Examples 18-26 includes estimating a state includes using a parametric model developed on a basis of temporal functions.

These and other examples and features of the present motion estimation and correction systems, and related methods are set forth in part in the above detailed description. This overview is intended to provide non-limiting examples of the present subject matter—it is not intended to provide an exclusive or exhaustive explanation.

While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A system, comprising:
  an image acquisition device configured to acquire an image via scanning an image frame over a period of time;
  an inertial measurement unit configured to measure at least one of a position, an orientation, and a movement of the image acquisition device during the period of time and output an indication of the movement as detected; and
  a state estimation module, operatively coupled to the inertial measurement unit and the image acquisition device, configured to estimate a state related to at least one of position and orientation of the image acquisition device based on the at least one of the position, the orientation, and the movement, wherein the state estimation module is configured to use a parametric model of the errors in the state estimates to effect the computation of the state updates, and to vary a number of terms in the parametric model of the errors in response to a magnitude of one or more errors.

2. The system of claim 1, wherein the state estimation module is configured to output the state as estimated, and further comprising a user interface configured to display the state as output from the state estimation module.

3. The system of claim 1, wherein the inertial measurement unit is rigidly connected to the image acquisition device.

4. The system of claim 1, wherein the image acquisition device is a rolling-shutter camera.

5. The system of claim 1, wherein the state estimation module comprises a processor configured to apply a parametric model to the movement to estimate the state.

6. The system of claim 1, wherein the inertial measurement unit includes at least one of an accelerometer, a gyroscope, and a magnetometer.

7. The system of claim 1, wherein the state estimation module is configured to output the state as estimated, and further comprising a state correction module operatively coupled to the state estimation module and configured to correct the image according to the state as output from the state estimation module.

8. The system of claim 1, wherein the state estimation module is configured to use a parametric model developed on a basis of temporal functions.

9. A state estimation circuit, comprising:
a memory module configured to store a description of a movement of an image acquisition device as computed based on an output of an inertial measurement unit during a period of time; and
a processor configured to estimate a state related to at least one of position and orientation of the image acquisition device, wherein the processor is configured to apply a parametric model of one or more errors in a state estimate to effect a computation of a state update, and to vary a number of terms in the parametric model of the errors in response to a magnitude of one or more errors;
wherein the image acquisition device is configured to acquire the image via scanning an image frame over the period of time.

10. The state estimation circuit of claim 9, wherein the state estimation circuit is configured to output the state as estimated to a user interface configured to display the state as output.

11. The state estimation circuit of claim 9, wherein the image acquisition device is a rolling-shutter camera.

12. The state estimation circuit of claim 9, wherein the inertial measurement unit includes at least one of an accelerometer, a gyroscope, and a magnetometer.

13. The state estimation circuit of claim 9, further configured to correct the image according to the state.

14. The state estimation circuit of claim 9, wherein the processor is configured to model motion of the image acquisition device during the period of time, in order to compute measurement residuals for updating a state estimate.

15. The state estimation circuit of claim 9, wherein the processor is configured to apply a parametric model developed on a basis of temporal functions.

16. A method, comprising:
acquiring an image from an image acquisition device by scanning an image frame over a period of time;
using an inertial measurement unit to acquire at least one of a position, an orientation, and a movement of the image acquisition device during the period of time;
estimating a state relating to the image acquisition device with a state estimation module, wherein estimating a state includes using a parametric model of one or more errors in a state estimate to effect a computation of a state update; and
varying a number of error estimation terms used to estimate the state relating to the image acquisition device.

17. The method of claim 16, further comprising displaying, on a user interface, the state as estimated from the state estimation module.

18. The method of claim 16, wherein using the inertial measurement unit includes using an inertial measurement unit that is rigidly connected to the image acquisition device.

19. The method of claim 16, wherein acquiring the image from an image acquisition device includes acquiring an image from a rolling-shutter camera.

20. The method of claim 16, wherein estimating the state relating to the image acquisition device includes utilizing a processor configured to apply a parametric model to the movement to estimate the state.

21. The method of claim 16, wherein using the inertial measurement unit includes using at least one of an accelerometer, a gyroscope, and a magnetometer.

22. The method of claim 16, further comprising using an state correction module to correct the image according to the state as output from the state estimation module.

23. The method of claim 16, wherein estimating a state includes using inertial measurements to model motion of the image acquisition device during the period of time to compute measurement residuals for updating a state estimate.

24. The method of claim 16, wherein estimating a state includes using a parametric model developed on a basis of temporal functions.

* * * * *

UNITED STATES PATENT AND TRADEMARK OFFICE
CERTIFICATE OF CORRECTION

PATENT NO. : 9,967,463 B2
APPLICATION NO. : 14/906869
DATED : May 8, 2018
INVENTOR(S) : Mourikis et al.

Page 1 of 2

It is certified that error appears in the above-identified patent and that said Letters Patent is hereby corrected as shown below:

On the Title Page

In item (*), in "Notice", in Column 1, Line 3, delete "days. days." and insert --days.-- therefor In the Specification In Column 2, Line 14, delete "$_G{}^GR(t+nt_r)$" and insert --$_G{}^CR(t+nt_r)$-- therefor In Column 3, Line 11, delete "$\tilde{\theta}(t+z)$," and insert --$\tilde{\theta}(t+\tau)$,-- therefor In Column 3, Line 49, delete "parametrization" and insert --parameterization-- therefor In Column 3, Line 55, delete "$^Cp_f(t+nt_r)={}_I^CR_G{}^IR(t+nt_r)(^Gp_f - {}^Gp_I(t+nt_r))+{}^Gp_I$" and insert --$^Cp_f(t+nt_r)={}_I^CR_G{}^IR(t+nt_r)(^Gp_f - {}^Gp_I(t+nt_r))+{}^Cp_I$-- therefor In Column 3, Line 64, delete "$^C\tilde{p}_f(t+nt_r)={}_I^C\tilde{R}_C{}^I\hat{R}(t+nt_r)(^G\tilde{p}_f - {}^G\hat{p}_I(t+nt_r))+{}^C\tilde{p}_I$" and insert --$^C\tilde{p}_f(t+nt_r)={}_I^C\tilde{R}_C{}^I\hat{R}(t+nt_r)(^G\tilde{p}_f - {}^G\hat{p}_I(t+nt_r))+{}^C\tilde{p}_I$-- therefor In Column 4, Line 5, delete "$^G\hat{p}_I(t+nt_r)={}^G\hat{p}_I(t)+{}^G\hat{v}_I(t)nt_r+\int_t^{t+nt_r}\int_{ts}^s {}^G\hat{a}_I(\tau)d\tau ds$" and insert --$^G\hat{p}_I(t+nt_r)={}^G\hat{p}_I(t)+{}^G\hat{v}_I(t)nt_r+\int_t^{t+nt_r}\int_t^{sG}\hat{a}_I(\tau)d\tau ds$-- therefor Signed and Sealed this
Fourth Day of June, 2019

Andrei Iancu
*Director of the United States Patent and Trademark Office*

CERTIFICATE OF CORRECTION (continued)

In Column 4, Lines 27-29, delete "$r=z-h({}_I^C\hat{R}{}_C^I\hat{R}(t+nt_r)({}^G\tilde{p}_f-{}^G\hat{p}_I(t+nt_r)+{}^C\tilde{p}_I)$" and insert -- $r=z-h({}_I^C\hat{R}{}_C^I\hat{R}(t+nt_r)({}^G\tilde{p}_f-{}^G\hat{p}_I(t+nt_r))+{}^C\tilde{p}_I)$ -- therefor In Column 5, Line 46, delete "θ($t+nt_r$)=θ($t$)" and insert --$\tilde{\theta}(t + nt_r) = \tilde{\theta}(t)$-- therefor